May 26, 1970   H. J. KOEBER, JR   3,514,179
STABILIZED OPTICAL SYSTEM AND METHOD OF STABILIZING IMAGES
Filed Sept. 12, 1966   5 Sheets-Sheet 1

INVENTOR.
Henry J. Koeber, Jr.
BY
GRIFFIN & BRANIGAN
Attys

May 26, 1970    H. J. KOEBER, JR    3,514,179
STABILIZED OPTICAL SYSTEM AND METHOD OF STABILIZING IMAGES
Filed Sept. 12, 1966    5 Sheets-Sheet 4

INVENTOR:
Henry J. Koeber, Jr.
BY GRIFFIN & BRANGAN
Attys

INVENTOR:
Henry J. Koeber, Jr.
BY GRIFFIN & BRANIGAN
Attys

United States Patent Office 3,514,179
Patented May 26, 1970

3,514,179
STABILIZED OPTICAL SYSTEM AND METHOD
OF STABILIZING IMAGES
Henry J. Koeber, Jr., Deerfield, Ill., assignor to Bell &
Howell Company, Chicago, Ill., a corporation of Illinois
Filed Sept. 12, 1966, Ser. No. 578,798
Int. Cl. G02b 23/00
U.S. Cl. 350—17                                    18 Claims

ABSTRACT OF THE DISCLOSURE

A movie camera including an optical wedge has one element of the wedge affixed to the camera housing and a second element thereof gyroscopically spatially stabilized inside the camera. The adjacent surfaces of the two wedge elements are planar and compensating motion of the movable element is restricted to a plane perpendicular to the optical axis of the wedge.

---

This invention relates to stabilized optical systems and more particularly to a mechanism for stabilizing the lenses of cameras, telescopes, field glasses, or other optical instruments against vibratory motions.

Whether optical instruments are hand held or mounted upon a platform which is subjected to vibratory motion, the lenses thereof are generally unavoidably vibrated, thereby resulting in an undesirable image at the focal plane. This is particularly true in the case of a movie camera where vibrations are recorded on successive frames of film which, when magnified during projection, produce a picture which is unpleasant to view and in some instances unintelligible. It is an object of this invention, therefore, to provide a method of, and apparatus for, lens stabilization wherein undesired vibrations are eliminated from the image at the instrument's focal plane, whether they be caused by an operator or a vibrating platform.

It is a more particular object of this invention to provide a movie camera that will produce a stable, non-vibratory picture whether the photographer takes pictures while walking, or riding in a car, or even flying in an aircraft, in which case the camera is subjected to both severe aircraft vibrations as well as the normal jiggle introduced by the photographer. The invention, however, is not limited to the field of hand held movie cameras. It also has great utility in other fields such as military optical instruments. For example, the Navy has refrained from using high powered binoculars because the users thereof have been unable to hold the binoculars sufficiently stable to focus upon the object which it is desired to view. The Naval forces have even been unable to make full use of the recent developments in the area of telescopic zoom lenses. Again, this is because the users have been unable to focus on a desired object during high zoom lens magnification. This is so even when the binocular or telescope is not hand held, but rather is fastened to a bracket rigidly mounted to a ship, for example.

The invention also has wide use in the field of aerial photography where stabilized moving pictures are rare indeed. Similarly, ground monitored visual guidance systems for missiles have generally proved ineffective because the image received by the ground monitoring station has been too unstable for an operator to accurately detect a target. The system of the invention remedies this situation. In addition, the invention has great utility for use in observational devices currently being used by the Army in tactical and reconnaissance aircraft. For example, the Army has recently experienced difficulties with its helicopter gunners losing sight of a target as soon as the guns are fired. That is, the vibrations from the guns cause related optical sighting systems to jiggle so much that the operator cannot focus on the target. In fact, it is for this reason that many land based anti-aircraft weapons have the sighting systems thereof sufficiently removed from the gun mounting that the gun vibrations do not interfere with the optical sighting mechanisms. By using an optical stabilization in accordance with the instant invention an operator's ability to visually focus on a desired object is not impeded by platform vibrations. Hence, the sighting mechanism can be located at the gun point.

One means of stabilizing a lens is to use the lens itself as the rotor of a gyroscope. That is, the lens that it is desired to stabilize is rapidly spun about its optical axis so that its angular momentum permits it to resist vibratory motion away from its spin axis. In this manner the lens is stabilized. This type of device, although quite suitable in most of its applications, has certain drawbacks which limit its use. For example, in some instances when the optical instrument with which it is associated is subject to very large amplitude vibrations the stabilized lens has the tendency to nutate. Consequently, it is an object of this invention to provide a lens stabilization system where the stabilized lens is substantially free from nutational tendencies.

It is another object of this invention to provide a lens stabilization system which not only compensates for instrument vibrations but is also of the "self-erecting" type. That is, the device has a characteristic that the rotor's spin axis will automatically follow and strive steadily to align itself with the axis of the driving member so that the lens always tends to become aligned with the instrument. This erection is accomplished by a precessional torque, the magnitude of which increases as the deviation of the spin axis from the driving axis increases.

In the past, stabilized optical systems have been suggested wherein one lens of an optical wedge is stabilized by connecting it through a rigid connection to a gyroscope housing. It has also been suggested that by mounting the gyroscope within an instrument, for example, so that the optical wedge comprises a portion of the instrument's objective lens, the instrument's image can be stabilized against accidental displacements. In this case, however the gyro rotor, the driving mechanism, and the optical wedge are all lined up along a single axis. Consequently the resulting structure becomes so large and cumbersome that it is impractical to use, especially in the case of hand held optical instruments such as movie cameras. It is an object of this invention, therefore, to provide a lens stabilization system which is sufficiently small and compact to be used in small optical instruments, especially those of the hand held type.

The optical wedge employed in the above-suggested stabilized optical systems includes a pair of lenses having mating curved surfaces such as a concave and a convex lens, which curved mating surfaces are spaced a small distance apart. One of the lenses is permitted to pivot about its center of curvature by means of a suitable linkage which is connected to a gyroscope. Consequently, as the movable lens pivots it always remains a fixed distance from the stationary lens. This system has proven to be adequate in most instances. However, great precision is required in the manufacture of these devices since a very slight error in the location of the pivot point of the movable lens causes the movable lens to engage the stationary lens when the movable lens is pivoted. This problem is compounded by the fact that the stationary lens and the movable lens must be very closely spaced in order to provide optimum optical performance. Consequently, it is a primary object of this invention to provide a stabilized optical coupl wherein the movable lens does not pivot with respect to th fixed lens.

Another problem with the optical wedge structures that have been previously suggested is also related to thin size. That is, in order to make a compact structure the lenses have been relatively thick and of small radii. This, however, has led to chromatic aberration problems, particularly when the lenses have been rotated about their axes. To combat these chromatic aberrations, attempts have been made to use larger lenses. When this path was taken, however, the lenses were required to undergo even larger relative pivotal motions. Hence, the opportunities became greater for undesirable physical contact between the stabilized lens and either their associated instrument housing or the other lens in the wedge. This contact led to both impaired optical performance and lens damage as well as severe nutation of the stabilized lens itself. For these reasons, therefore, many attempts have been made to provide stabilized wedge structures having large radius lenses without their attendant problems of physical contact and nutation. Consequently, because these attempts have not been very successful it is another primary object of this invention to provide such a structure.

In accordance with the principles of this invention, a fixed lens and a movable lens each having a planar surface are aligned so that the planar surfaces are parallel and face each other. The optical axes of the lenses are parallel and normally coincident. The movable lens is provided with support means which allows it to move so that its planar surface is restricted solely to movement in a direction perpendicular to the optical axes. In other words, the planar surface of the movable lens is restricted to movement within its own plane. Consequently, the fixed and movable lenses always maintain a fixed distance between all points on their opposed planar surfaces and the movable lens does not pivot with respect to the fixed lens.

More particularly, a gyroscopic rotor is driven by a drive means about a spin axis with the rotor being mounted with respect to the drive means so that its spin axis is free to pivot about a point on the drive axis of the drive means. A parallelogram linkage connects the gyroscope rotor with the movable lens of the optical wedge in a manner so that components of motion of the gyroscope rotor in the plane of the planar surface of the movable lens cause the movable lens to move solely in the plane of its planar surface. Moreover, the parallelogram linkage system functions to transform relative movement of the gyroscope rotor into a corresponding movement of the movable lens in an amount necessary for the optical wedge to provide a stabilized image.

In this manner, the image at the focal plane remains stable even though the housing of the optical instrument is subjected to undesirable vibrations. Moreover, because the mating surfaces of the wedge are planar, at least one of the stabilized lens' surfaces can be described as having an infinite radius. Consequently, the chromatic aberration problems of previously suggested devices have been substantially reduced; and because there is none of the previously required relative pivotal motion between the wedge elements, there is no physical contacts between the lenses and much less chance of physical contact between the stabilized lens and the instrument housing.

An advantage of the instant invention is that it is a relatively simple device which is susceptible to having large tolerances and is therefore capable of being manufactured at low cost.

A movie camera is perhaps the most common type of optical device wherein instrument vibration will defeat the purposes for which the instrument is intended. For this reason, although it is suitable for use in a wide variety of instruments, a preferred embodiment of the invention will herein be illustrated as being used in combination with a movie camera.

The foregoing and other objects, features and advantages of the invention will be apparent from the following more particular description of preferred embodiments thereof, as illustrated in the accompanying drawings wherein the same reference numerals refer to the same parts throughout the various views. The drawings are not necessarily intended to be to scale, but rather are presented so as to illustrate the principles of the invention in clear form.

Figure 1:
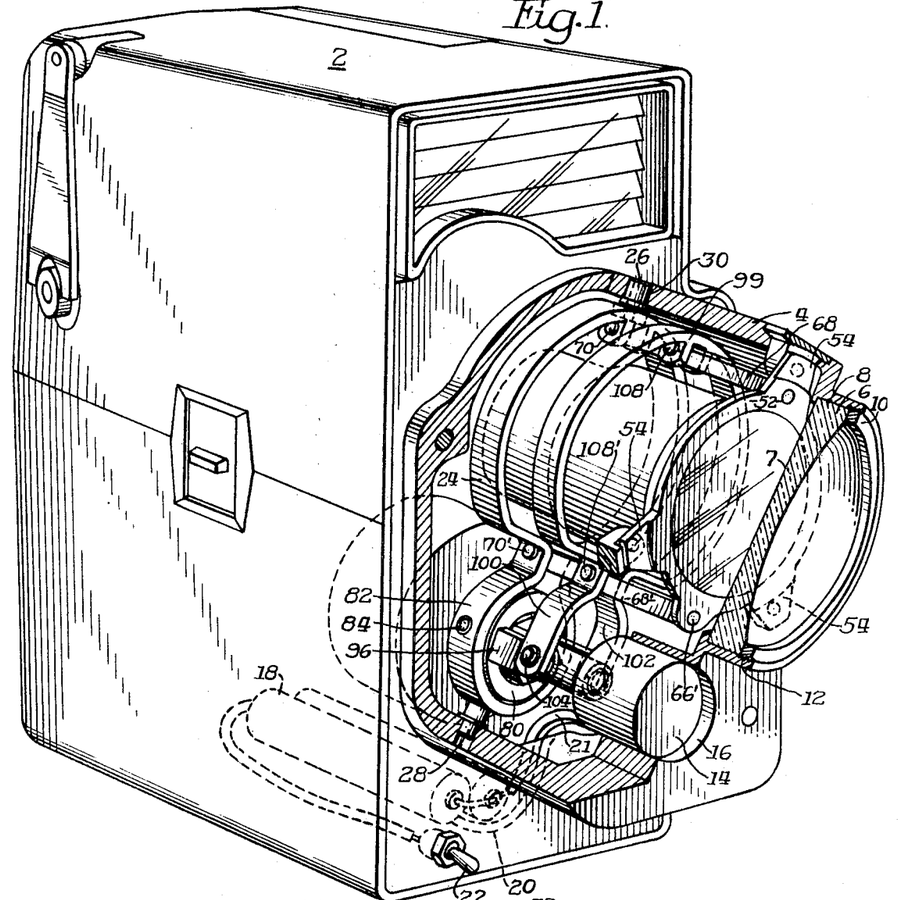
FIG. 1 is a perspective view of a camera, partially broken away to illustrate the incorporation therein of a preferred embodiment of the invention.
Figure 2:
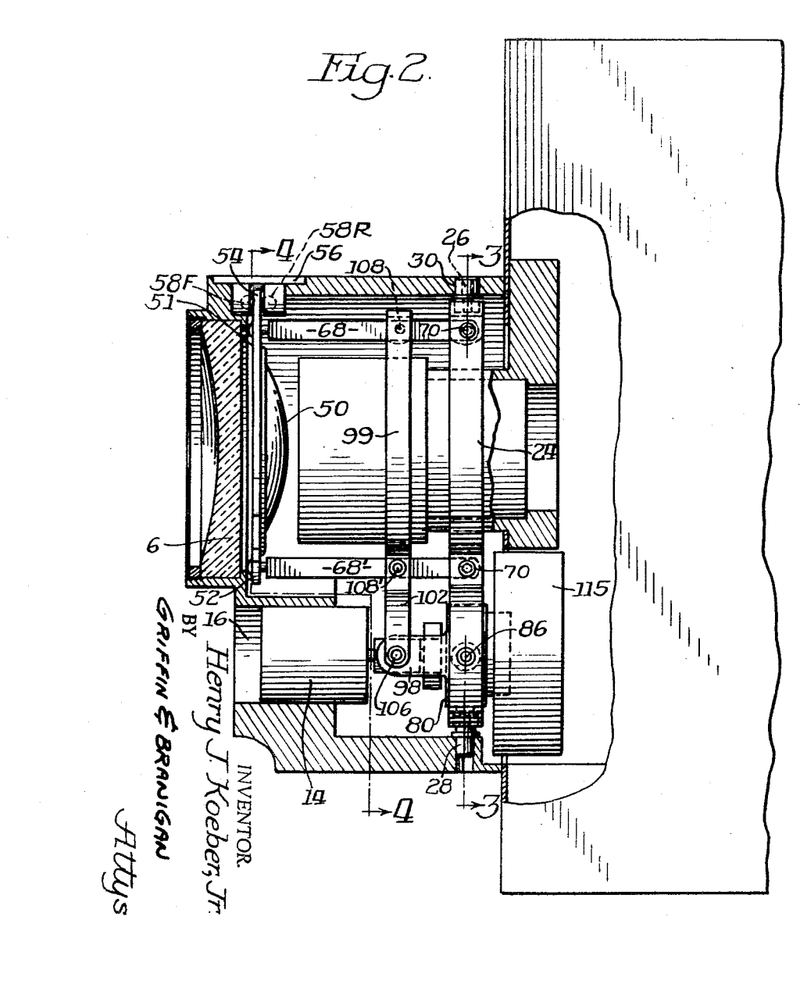
FIG. 2 is a side view of a lens stabilization device embodying the invention.

Referring to the drawings, a preferred embodiment of the invention will now be described. The camera 2 has a portion of the housing 4 thereof extending to the right in FIG. 1. A lens 6 having a flat rear face 7 is retained in a recess 8 of the housing 4 by means of a retaining ring 10 which is threadably engaged with a mating portion 12 of the recess 8 as is also shown in FIG. 2. A DC motor 14 is retained in an aperture 16 in the lower portion of the camera housing 4 and receives its power by means of batteries 18 through a switch 22 by means of leads 20 and 21.

Figure 3:
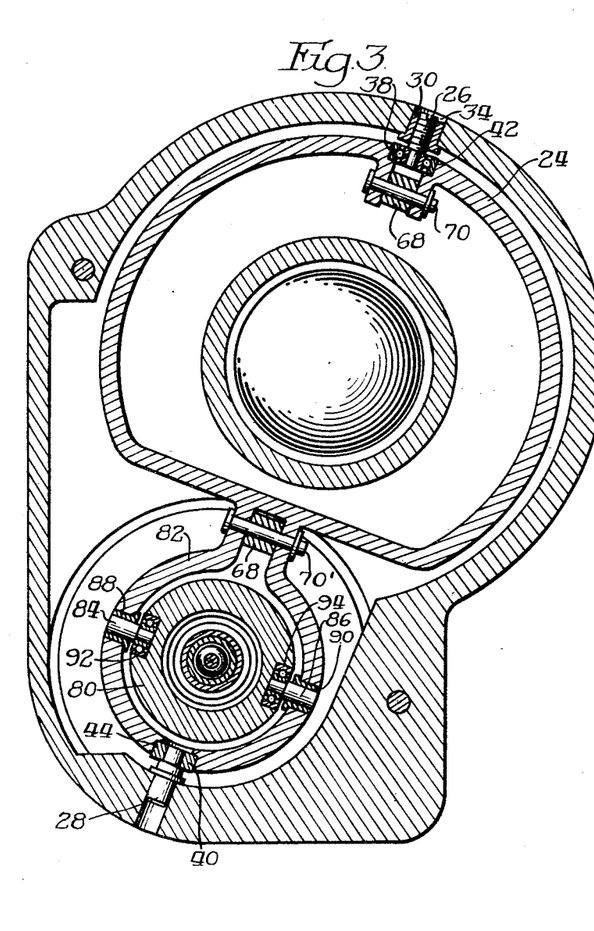
FIG. 3 is a sectional view of the embodiment of the invention illustrated in FIG. 2 taken along the lines 3—3 thereof.

A double gimbal ring 24 is pivotally mounted in the housing for rotation about an axis defined by a pair of co-planar axially aligned gimbal pins 26 and 28. As is best shown in FIG. 3, the gimbal pins 26 and 28 are fastened to the upper and lower portions of the housing 4 by any convenient means such as a threaded sleeve insert 30 which is pressed into receptacle 34 of the housing. The other ends of the gimbal pins 26 and 28 are fastened to inner races of bearing assemblies 38 and 40, the outer races of which are pressed into receptacles 42 and 44 in the double gimbal ring which are in axial alignment with the housing receptacle 34. In this manner, the double gimbal ring is adapted to pivot about the axis defined by the gimbal pins 26 and 28. It will be appreciated that while the double gimbal ring is illustrated as being pivotable about an axis off the vertical, the inclined mounting is merely for convenience and that the double gimbal ring can pivot about a differently inclined axis or even about the vertical without departing from the spirit and scope of the invention.

Figure 4:
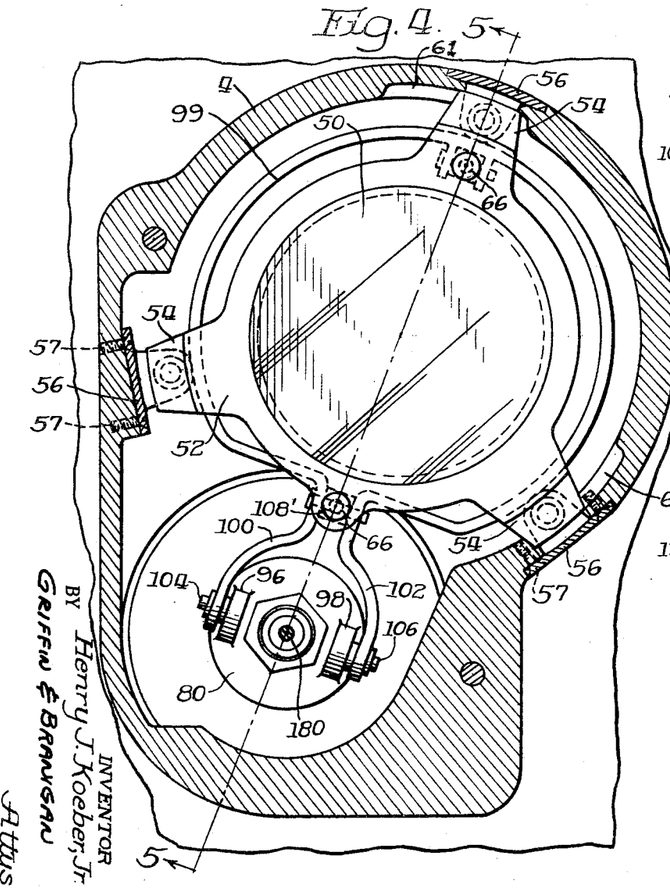
FIG. 4 is a sectional view of the embodiment of the invention illustrated in FIG. 2 taken along the lines 4—4 thereof.
Figure 5:
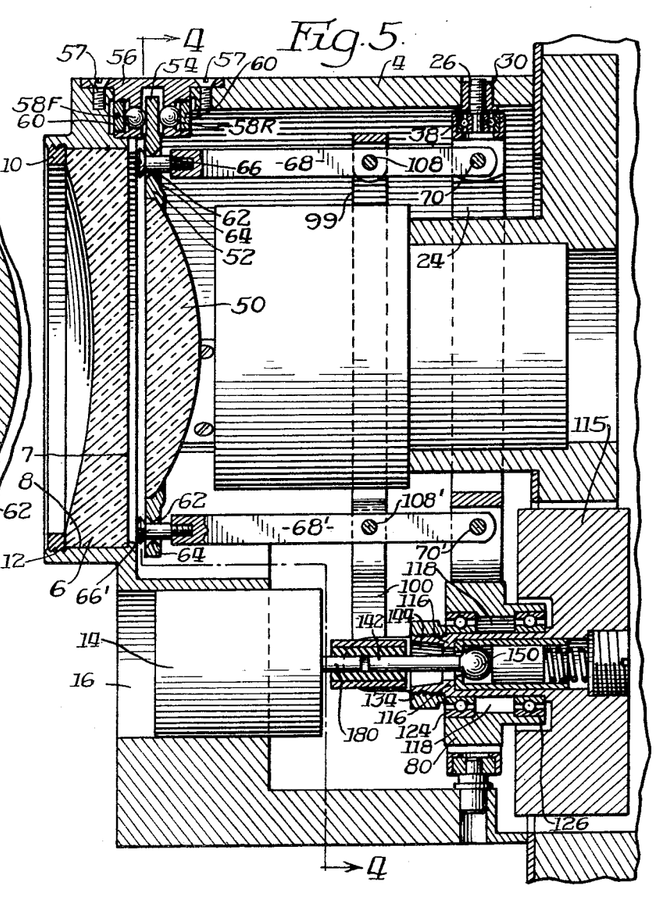
FIG. 5 is a bisecting sectional view of the embodiment of the invention illustrated in FIG. 4 taken along the lines 4—4 thereof.

A stabilized lens 50 having a flat front face 51 (FIG. 6) is mounted by any suitable means on a support plate 52 which has three lugs 54 extending radially outwardly and spaced 120° apart about its periphery. Each of the lugs 54 extends into a related roller bearing mounting means 56 which is attached to the lens housing 4 by any conventional means such as screws 57 (FIG. 4). Each of the roller bearing mounting means has a spherical front roller 58f and a spherical rear roller 58r which engage the front and rear sides of the respective lug 54. The rollers 58 may be made of any suitable material such as that distributed by the Du Pont Corporation under the trademark "Teflon." These rollers are adjustable in a direction parallel to the optical axis of the camera by means of adjustably threaded plugs 60 (FIG. 5). The centers of all of the front rollers 58f are aligned in a plane normal to the optical axis of the camera and the centers of the rear rollers 58r similarly lie in another plane normal to the optical axis of the camera. The positions of all of the rollers 58 are adjusted by their respective lugs 60 so that each of the rollers lightly engages its related lug 54. Consequently, lugs 54, support plate 52, and stabilized lens 50 can only move in a plane normal to the optic axis of the camera. The axial position of lens 50, however, can be adjusted a small amount by adjusting all of the lugs 60 so as to move their associated bearings 58 so long as support plate 52 and lens 50 remain in a plane normal to the optic axis of the camera.

The lens housing 4 is recessed (61) adjacent two of the roller bearing mounting means 56 as shown in FIG. 4 to enable assembly of the camera. No recess is required adjacent the leftmost mounting means 56 illustrated in FIG. 4 due to the adequate open space around this bearing mounting means. In this connection the support plate 52 is inserted into the camera axially (into the paper as shown in FIG. 4) so that the lugs 54 are within recesses 62 and are aligned between the front and rear bearings 58. The support plate is then rotated clockwise as shown in FIG. 4 so that the lugs move to a position between the bearings. The support plate is supported in this position by means to be discussed hereinafter.

A pair of round openings 62 (FIG. 5) are provided in the support plate 52. The openings 62 each have a circular inner knife edge 64 which respectively encircles upper and lower pins 66 and 66', there being sufficient clearance, however, so that the pins can slide back and forth within the openings. Each of the pins 66 and 66' is threaded into the end of a respective one of rigid horizontal upper and lower links 68 and 68'. The other end of each of the links 68 and 68' is attached to the double gimbal ring 24 by respective upper and lower pivot pins 70 and 70' (FIG. 5). Hence, movement of links 68 and 68' is restricted to pivotal movement about pins 70 and 70'. A transfer member 80 (FIGS. 1 and 2) is pivotally mounted in the lower ring 82 of the double gimbal ring for rotation about an axis defined by axially aligned gimbal pins 84 and 86. These gimbal pins are mounted by means of threaded sleeves 88 and 90 and bearing assemblies 92 and 94 in the same manner as was described in connection with the previously discussed gimbal pin mountings. In this case, however, although the axis defined by gimbal pins 84 and 86 may be either on the horizontal or inclined at some angle therefrom, that axis should be substantialy parallel to the pivot axes defined by pivot pins 70 and 70' as will become apparent shortly.

The transfer member 80 has two arms 96 and 98 extending outwardly therefrom as best shown in FIGS. 2 and 4. A transfer yoke 99 (FIGS. 4 and 5) has a pair of transfer yoke arms 100 and 102 pinned at their lower ends in FIG. 4 to the transfer arms 96 and 98 by means of suitably mounted axially aligned pin assemblies 104 and 106 respectively. The upper end of the transfer yoke 99 has a pin assembly 108 attached thereto and extending through upper rigid link 68 so that the rigid link and transfer yoke pivot about pin 108. A lower pin 108' is attached to an intermediate portion of the transfer yoke as shown in FIGS. 4 and 5. Pin 108' extends through an intermediate portion of the lower rigid link 68' so that link 68' and transfer yoke 99 pivot with respect to each other about pin 108'. Pins 104, 106, 108, and 108' have parallel axes defining a plane normal to the camera axis.

Consequently, as the transfer member 80 pivots upwardly and downwardly about the axis defined by gimbal pins 84 and 86 this motion is transferred through the transfer arms 96 and 98 and transfer yoke 99 to the rigid links 68 and 68'. The movement of links 68 and 68' and pins 66 and 66' attached thereto causes support plane 52 to reciprocate between bearings 58. (As was noted previously, movement of support plate 52 is restricted to movement in a plane normal to the optical axis of the camera.) In addition, the support plate 52 moves back and forth within the confines of the bearings 58 to the same extent that the transfer member 80 pivots about the axis defined by gimbal pins 26 and 28. Hence, the lens support plate 52 moves back and forth as well as up and down in accordance with both the pitching and yawing motions of the transfer member 80.

Figure 6:
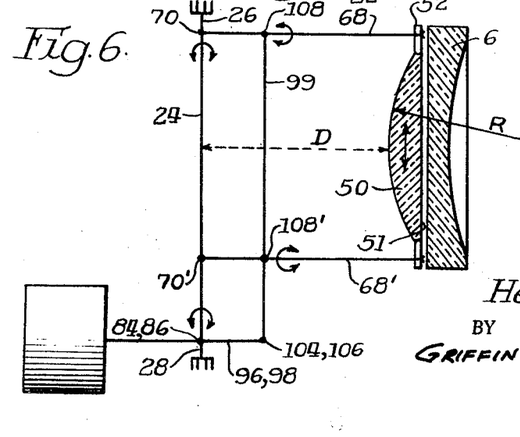
FIG. 6 is a schematic diagram illustrating the dimensional relationships of the primary elements of the stabilizing means of this invention.

The linkage arrangement which enables the aforementioned movement is illustrated in schematic form of a vertical view in FIG. 6. It should be noted that members 24, 68, 52, and 68' form a parallelogram linkage arrangement. When the transfer yoke arm 99 is moved in small amounts as by pivoting of arms 96 and 98 about pivots 84 and 86, double gimbal ring 24 and lens support plate 52 remain parallel since they comprise opposite sides of the parallelogram linkage. However, at least for small motions of the arms 96 and 98, the lens support plate 52 does not move closer to the double gimbal ring since the lens support plate is restrained against movement in that direction by the spherical roller bearings 58. Instead the pins 66 and 66' slide axially in the openings 62.

Figures 7, 8:
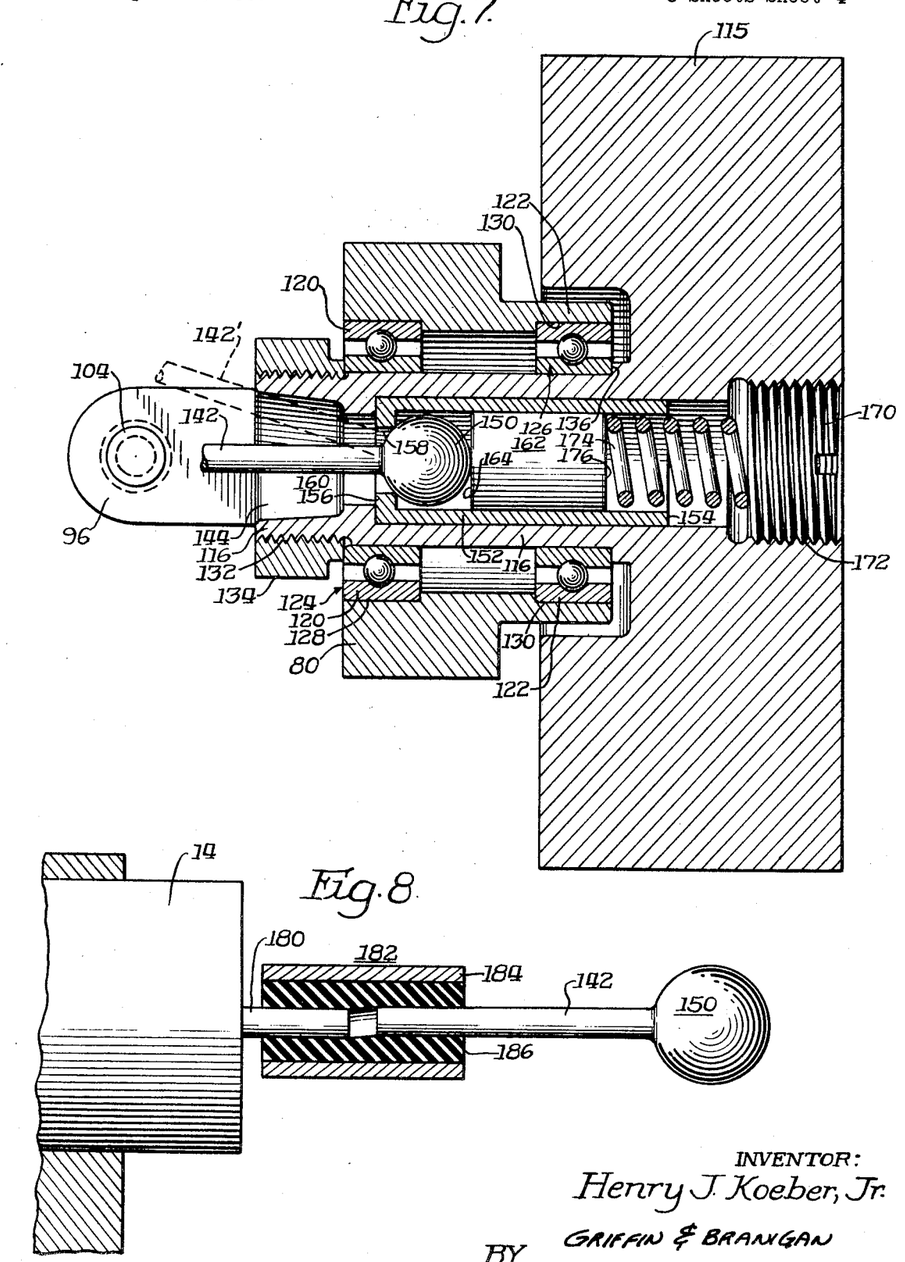
FIG. 7 is an enlarged fragmentary sectional view of the friction erection mechanism substantially as shown in FIG. 5.
FIG. 8 is a sectional view illustrating the coupling device of FIG. 5 in more detail.

Having described the mechanism whereby the relative motion of the lenses 6 and 50 is confined to parallel planes, the structure for determining the amount and direction of this motion will now be described. With reference to FIGS. 5 and 7; a rotor 115 has a support arm 116 thereof extending to the left through a central opening 118 in the transfer member 80. The outer races 120 and 122 of bearing assemblies 124 and 126 (FIG. 7) are pressed into recesses 128 and 130 of the transfer member 80 respectively. The inner races of the bearing assemblies 124 and 126 are pressed onto the support arm 116. As shown in FIG. 7 the left end of the support arm is threaded at 132 to receive a retaining nut 134. The retaining nut is fastened so that it and a shoulder 136 on the rotor 115 are snugged up against the inner races of the bearing assemblies 124 and 126 respectively. The rotor therefore is rotatable about an axis through the center of the transfer member. Moreover, because the rotor is fastened to the transfer member 80, any pitching motion of the rotor's spin axis is transmitted through the transfer arms 96 and 98 and the transfer yoke arms 100 and 102 to the lens support plate 52. Similarly, any yawing motion of the rotor's spin axis is transmitted to the lens support member by means of the gimbal pin sets 84–86, 26–28, and 108–108'. Hence the lens 50 moves in its confined plane by an amount corresponding to the pitching and yawing motion of the rotor 115. In addition, the rotor functions to counter balance the weight of the lens and its supporting structure about the gimbal axis defined by gimbal pins 84 and 86.

In FIGS. 5 and 7, a drive shaft 142 extends from the left into a relatively wide central opening 144 of the rotor support arm 116. A driving sphere 150 is mounted on the end of the drive shaft 142 in the center of the rotor support arm's central opening and has its center substantially in the plane defined by the above described gimbal pins 26, 28, etc. The rotor support arm's central opening is lined by sleeve member 152 which is open at its right end 154 in FIG. 7, but closed at its left end 156 except for an aperture 158 for generously accommodating the shaft 142. In this manner, the shaft is free to move relative to the sleeve's axis into a position, for example, such as is found in position 142'. The aperture 158 has an inner circle of contact 160 with the driving sphere 150. A plug 162 is located within the sleeve 152 and has a substantially flat end 164 thereof in substantially point contact with the driving sphere 150. A threaded plug member 170 is inserted into a correspondingly threaded recess 172 located about the axis of the rotor 115. A spring 174 is also partially located within the sleeve 154. The left end of the spring 174 bears against the right end 176 of the plug 162 and urges the plug's flat end 164 into its point contact engagement with the sphere 150. The force of the plug 162 upon the sphere 150 in turn urges the left side of the sphere in FIG. 6 into engagement with the circle of contact 160 on the inner portion of the sleeve's aperture 158. The force exerted by the plug 162 upon the sphere 150 and hence the force exerted by the circle of contact 160 upon the sphere can be varied by adjusting the position of the threaded plug 170 to change the force of the spring 174.

As shown in FIGS. 5 and 8 the output shaft 180 of the motor 14 is connected to the driving sphere's shaft 142 by means of a sleeve assembly 182. The sleeve assembly is comprised of a rigid outer member 184 such as, for example, a piece of steel tubing and an inner member 186 which is of a more resilient nature. The sleeve 186 surrounds the two shafts 180 and 142, but because of its resilient nature is adapted to "take-up" minor misalignment between the two shafts. The outer sleeve 184, on the other hand, because of its rigid nature prevents the shafts from wobbling with respect to each other when the shaft 142 is driven by the shaft 180 as will be described in more detail shortly.

The operation of the above-described structure will now be briefly described after which will follow a more detailed description of the co-active relationships between the rotor, the driving sphere, and the stabilized lens. Briefly, the motor, powered by the batteries 18, drives the shaft 142 which extends out of the sleeve assembly 182. As the sphere 150 is in turn rotated by the shaft 142 the frictional forces between it and the circle of contact, cause the rotor to spin about its geometric axis within the transfer member's bearing assemblies 124 and 126. As the rotor spins it acts as a gyroscope and hence is stable in space about its spin axis. As the camera housing moves in space, shafts 180 and 142, and the sphere 150 move with it. The rotor, however, remains relatively stationary. This is represented in FIG. 7 where the shaft 142' has been pivoted so that its axis is no longer in alignment with the geometric or spin axis of the rotor 115.

Referring again to FIG. 2, although the rotor 115 actually remains relatively stable in space as the camera wiggles, with respect to the camera it appears as though the rotor moves. Consequently, as the rotor 115 apparently pitches about the axis through the gimbal pins 84 and 86, its relative motion is transmitted through the transfer member 80 and the transfer yoke arms 100 and 102 to the lens support plate 52 and the stabilized lens 50 to move it up and down. Similarly, as the rotor apparently yaws about the axis through gimbal pins 26 and 28, a back and forth motion corresponding to the relative yawing motion is transmitted to the stabilized lens 50 through the double gimbal ring 24, and rigid links 68 and 68'.

As was previously noted, the lens doublet comprised of lenses 6 and 50 forms an optical wedge. That is, parallel light rays entering the lens 6 exit from lens 50 in rays that are parallel but collectively divergent from the axis of lens 6 by an amount corresponding to the divergence of lens 50's axis from the axis of lens 6. In other words, in FIG. 5 for example, if a horizontal light ray passing through the center of lens 6 normally strikes the center of the camera's focal plane, it continues to do so even though the lens 6 is inclined off of the horizontal so long as the axis of lens 50 is moved a proper control distance in a direction normal to the optical axis of lens 6.

In order to provide the proper amount of movement of lens 50 for a given motion of the camera, it is merely necessary that the above-described linkage system be suitably proportioned in accordance with the remainder of the system's dimensions. Because these dimensions differ from structure to structure, further detailed discussion of this point will not be undertaken. One general relationship, however, has been found to produce satisfactory results. That is, with reference to FIG. 6, it has been found that admirably compensated images result when the distances D and R are equal; or more particularly, when the distance D between the plane defined by the axes of gimbal pins 26, 28, 70, and 70' and the curved surface of lens 50 is equal to the radius of curvature R of the curved surface of lens 50 when the optical axes of lenses 50 and 6 are coincident as illustrated in FIG. 6. By thusly moving lens 50 by an amount corresponding to the amount of camera motion, light rays entering the optical wedge are bent so as to be directed towards the same points in the camera's focusing lenses and focal plane irrespective of relative motion between the camera and the source of the light rays.

It will be apparent from the above brief description that as the camera housing is subjected to vibrations the circle of contact 160 moves across the surface of the driving sphere 150 a distance determined by the amplitude of the vibrations. At the same time, the lenses 6 and 50 have their axes displaced from each other in proportion to the amplitude of the vibrations. As noted above, therefore, the light rays entering the camera are bent an amount corresponding to the vibrations in which the camera housing is subjected. In this manner, the image appearing at the camera's focal plane remains constant irrespective of external vibrations.

Figure 9:
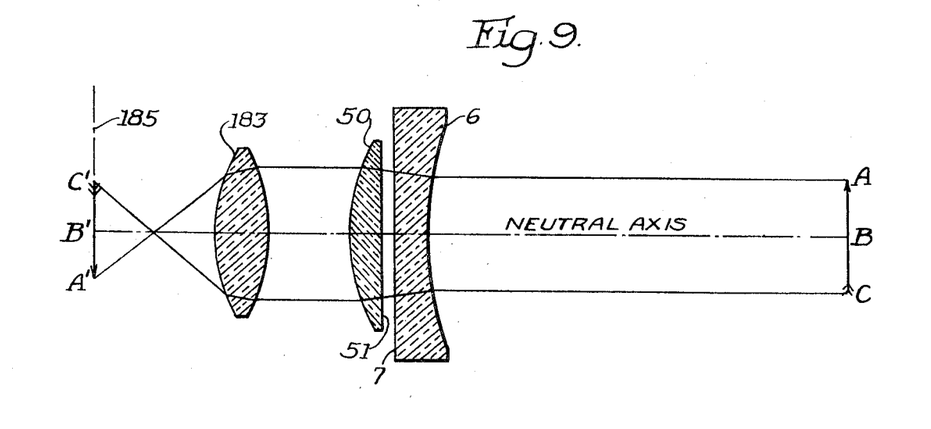
FIG. 9 is a schematic diagram of an image received at the focal plane of a camera as the camera views an object.

Having described the structure and the mechanical operations of the invention, the optical operation of the above-described preferred embodiment of the invention will now be described with reference to the schematics of FIGS. 9 and 10. Turning first to FIG. 9, the arrow ABC represents an object which it is desired to photograph at a time when the lens stabilization is in its original position with the drive axis of the shaft 142 superposed on the spin axis of the rotor in FIG. 7. At this time, the axes of the lenses 6 and 50 are also superposed so that light rays from the right in FIG. 9 pass through the two wedge elements and, after passing through a focusing lens 183, form an inverted image of the object A'B'C' at the focal plane 185 of the camera.

Figure 10:
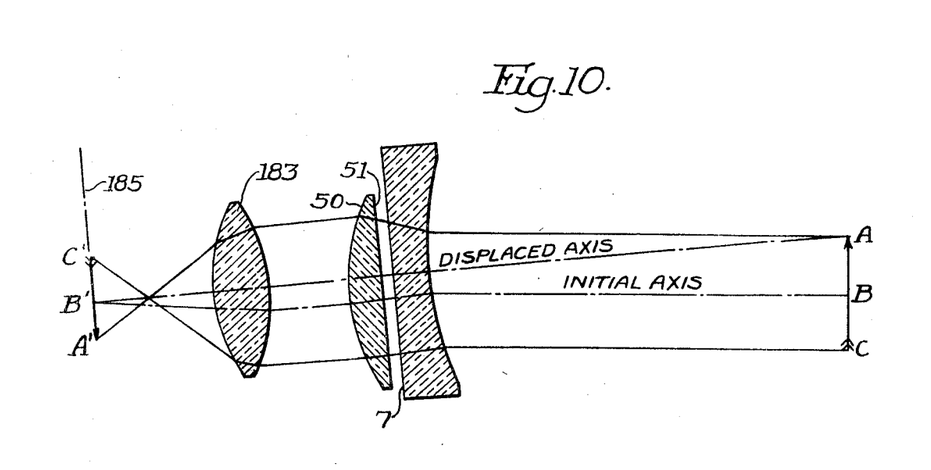
FIG. 10 is a schematic diagram of the image at the focal plane when a camera embodying the invention is subjected to a vibration.

FIG. 10 illustrates the case where a photographer has moved the camera off of its initial axis as illustrated by a displaced axis. The lens elements 6 and 183 are displaced along with the camera housing as shown. However, the stabilized lens 50 is connected to the stable rotor 115, and although tilted as illustrated, is moved a required amount with respect to lens 6 so that it continues to direct the image A'B'C' to the same position on the focal plane that the image occupied in FIG. 9. For this reason, the entire image A'B'C' of the object ABC is placed upon the focal plane 185 of the camera just as though the camera had not been displaced. Thus, the lens stabilization system of this invention eliminates the photographic effect of undesired vibrations caused by the photographer. Moreover, even if the platform upon which the photographer is located is subjected to random vibrations in addition to those caused by the photographer, the image at the focal plane of the camera will be further compensated whereby the undesired vibrations will not show up in the final photographs.

Perhaps more importantly, however, the instant invention provides a stabilized lens structure that is both compact and of an effectively large radius, wherein the lens is free to undergo relative motion without being physically obstructed by other elements of its associated structure. In this manner, an image that is transmitted through the lens is not only stable, but is both chromatically acceptable and free of the undesirable effects of nutation.

It will be appreciated by those skilled in the art that although the invention has been illustrated in connection with a movie camera wherein the vibrations were introduced by a photographer, that a similar structure is easily incorporated into binoculars, telescopes, gun sights, or other optical instruments. Moreover, although the invention is particularly well suited for hand held optical instruments wherein weight and compactness are prime requisites, the invention is not at all limited thereto. For example, the invention is equally applicable to ground control optically guided missile systems.

While the invention has been particularly shown and described with reference to a preferred embodiment thereof, it will be understood by those skilled in the art that various changes in form and details may be made therein without departing from the spirit and scope of the invention. For example, the roller balls 58 can be replaced with oppositely poled magnetic bearings. If this is found desirable, oppositely poled magnetic elements can be used to support a laminated lens bearing ring whose surfaces have the same polarity as the magnetic elements they face.

The embodiments of the invention in which an exclusive property or privilege is claimed are defined as follows:

1. An image stabilization system mounted on a randomly movable support means, said image stabilization system comprising:
   an image receiving means;
   first and second lenses through which an optical image is directed to a given portion of said image receiving means fixedly positioned on said support means;
   means fixedly mounting said first lens on said support means;
   means mounting said second lens for movement relative to said first lens and said support means in a plane normal to the optic axis of said first lens;
   and stabilizing means responsive to movement of said support means for moving said second lens relative to said first lens by an amount corresponding to said movement of said support means so that the image transmitted through said lenses is directed to said given portion of said image receiving means, irrespective of said motion of said support means.

2. The apparatus of claim 1 wherein said mounting means includes means for maintaining the axes of said first and second lenses parallel throughout relative motion therebetween.

3. The apparatus of claim 1 wherein the opposed adjacent surfaces of said first and second lens are planar.

4. The apparatus of claim 3 wherein said mounting means includes means for maintaining the axes of said first and second lenses parallel throughout relative motion therebetween.

5. The apparatus of claim 3 wherein said stabilizing means includes a gyroscope.

6. The apparatus of claim 5 wherein said mounting means includes means for maintaining the axes of said first and second lenses parallel throughout relative motion therebetween.

7. The apparatus of claim 5 wherein said gyroscope is offset with respect to said optic axis.

8. The apparatus of claim 7 wherein said mounting means includes means for maintaining the axes of said first and second lenses parallel throughout relative motion therebetween.

9. The apparatus of claim 3 wherein the stabilizing means includes a gyroscope the axis of the rotor of which is offset from said optic axis and pivotable about a point which is in a reference plane that is orthogonal to said optic axis; and wherein the shortest distance between said second lens and the curved surface of said second lens is equal to the radius of curvature of said curved surface of said second lens.

10. The apparatus of claim 9 wherein the axes of said first and second lenses are parallel.

11. A method of stabilizing the images projected through the lenses of an optical image receiving device of the type which includes a pair of lenses having parallel optic axes and an image receiving station comprising the steps of:
    detecting motion of said optical image receiving device;
    and moving one of said lenses in a direction that is solely normal to the optic axes by an amount corresponding to the amount of said detected motion so that the image projected through said lenses onto said image receiving station does not move with respect to said image receiving device.

12. The apparatus of claim 1 wherein said means for mounting said second lens includes:
    a lens holding plate for holding said second lens; and
    bearing means on said support means, said holding plate being retained about its periphery by said bearing means so that said holding plate and thereby said second lens are constrained from motion along the axis of said second lens, but movable in said plane normal to said optical axis.

13. The apparatus of claim 12 wherein said stabilizing means includes:
    a spatially stabilized rotor;
    transfer means for following motion of said rotor relative to said support means;
    a plurality of linkage elements connecting said transfer means to said lens holding plate so that only the motion of said transfer means normal to said optic axis is transmitted to said lens holding plate.

14. The apparatus of claim 13 wherein said lens holding plate has openings therein; and selected linkage elements slidably pass through said openings parallel to said optic axis.

15. The apparatus of claim 1 wherein said stabilizing means comprises:
    a rotor;
    drive means rotatable about a drive axis to drive said rotor about a spin axis so that its spin axis is free to diverge from said drive axis;
    a transfer member coaxial with said spin axis of said rotor and moveable with said rotor but stationary with respect to the rotor's motion about said spin axis;
    a gimbal suspension means;
    connecting means connecting said transfer member to said gimbal suspension means so that motion of said rotor is transmitted to said gimbal suspension means; and
    a parallelogram linkage connecting said gimbal suspension means to said means for mounting said second lens so that only components of motion of said rotor in a plane orthogonal to the optical axis of said second lens are transmitted to said means for mounting said second lens.

16. The apparatus of claim 15 wherein said drive means includes a spherical surface; and erecting means on said rotor in frictional contact with said spherical surface whereby the frictional forces between said erecting means and said spherical surface cause said spin axis to tend to be superposed on said drive axis.

17. The apparatus of claim 16 wherein the means for mounting said second lens includes:
    a lens holding plate for holding said second lens; and
    bearing means on said support means, said holding plate being retained about its periphery by said bearing means so that said second lens is constrained from motion along its optical axis, but movable in said plane normal to said optical axis.

18. The apparatus of claim 17 wherein said lens holding plate has openings therein and selected elements of said parallelogram linkage slidably pass through said openings parallel to said optic axis.

(References on following page)

References Cited

UNITED STATES PATENTS

| | | | |
|---|---|---|---|
| 3,291,996 | 12/1966 | Stinson | 350—247 |
| 3,359,849 | 12/1967 | Friedman. | |
| 2,273,876 | 2/1942 | Lutz et al. | |
| 2,321,051 | 6/1943 | Thurlow et al. | |
| 2,959,088 | 11/1960 | Rantsch | 350—16 X |
| 3,253,525 | 5/1966 | Merkel | 95—12.5 |
| 1,588,682 | 6/1926 | Henderson. | |
| 1,628,776 | 5/1927 | Henderson. | |

FOREIGN PATENTS

| | | |
|---|---|---|
| 1,015,916 | 1/1966 | Great Britain. |
| 232,759 | 4/1925 | Great Britain. |
| 121,565 | 11/1957 | Russia. |
| 1,165,885 | 3/1964 | Germany. |
| 427,150 | 11/1947 | Italy. |

PAUL R. GILLIAM, Primary Examiner

U.S. Cl. X.R.

350—247, 320; 356—149